United States Patent Office 3,239,520
Patented Mar. 8, 1966

3,239,520
N-(MONOCARBOCYCLIC ARYLOXY-LOWER ALKYL) - N' (DILOWERALKYL, OR HETEROCYCLIC)-LOWER ALKYLENE DIAMINES
Elzina G. van Proosdij-Hartzema, Hilversum, and Geertruida C. van Leeuwen and Antony M. Akkerman, Amsterdam, Netherlands, assignors to N.V. Nederlandsche Combinatie Voor Chemische Industrie, Amsterdam, Netherlands, a limited-liability company of the Netherlands
No Drawing. Filed July 25, 1962, Ser. No. 212,456
Claims priority, application Great Britain, Nov. 20, 1961, 41,396/61; June 7, 1962, 22,101/62
8 Claims. (Cl. 260—247.5)

This invention relates to new substituted phenoxyalkyl-aminoalkyl-tert. amines and their acid addition salts, and to methods of producing the same.

Compounds represented by the following general formula:

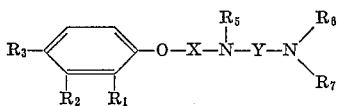

in which:

$R_1$, $R_2$ and $R_3$ are selected from the class consisting of hydrogen and lower alkyl, lower alkoxy, trifluoromethyl, fluoro, chloro, bromo and nitro groups, or $R_2$ and $R_3$ are combined in a methylene dioxy group;
$R_6$ and $R_7$ together with the nitrogen atom form a member selected from the group consisting of Z-morpholino, Z-thiomorpholino, Z-piperidino and Z-pyrrolidino, wherein Z is selected from the group consisting of hydrogen and lower alkyl;
$R_5$ is selected from the class consisting of hydrogen and lower alkyl groups;
X and Y are alkylene chains, either straight or branched, and consisting of from 2 to 4 carbon atoms, and the acid addition salts of the above compounds have been found to be valuable antitussive agents, devoid of undesirable side-effects. Such compounds and their acid addition salts are especially valuable because of the absence of analgesic properties and local anesthetic effects when administered in active dosages.

The most valuable compounds are those in which

stands for a 4-morpholino group, whether or not lower-alkyl-substituted.

Various methods are known for the preparation of analogous compounds, and these known methods are applicable to the manufacture of compounds in accordance with the present invention. The most convenient methods are:

(1) Reaction of aminoalkylamines with phenoxyalkanoylhalides followed by reduction of the reaction products, for example, with lithium aluminum hydride.

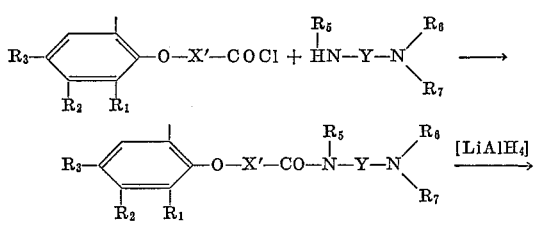

X' is an alkylene group with one carbon atom less than X.

(2) Reduction of a (N-phenoxyalkanoylamino)-alkanoyl amine, for example, with lithium aluminum hydride:

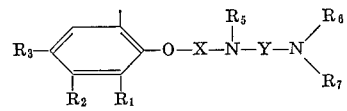

X' and Y' represent alkylene groups with one carbon atom less than X and Y, respectively.

(3) Reaction of phenoxyalkylhalides with aminoalkylamines:

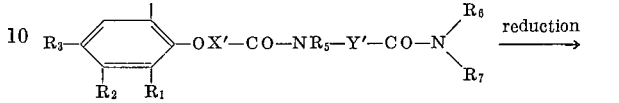

(4) Compounds in which $R_5$ is a lower alkyl group can be prepared by alkylation of the corresponding secondary amines, in accordance with either of the following methods:

(a) Addition of a lower aliphatic carbonyl compound to the secondary amine and reduction of the adduct by suitable reductive agents, such as, formic acid or catalytic hydrogen.

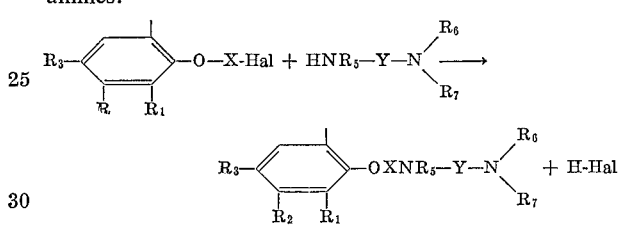

(b) Conversion of the secondary amine into an amide by reaction with a suitable lower alkanoyl acylating agent, followed by reduction of the amide grouping, for example, with lithium aluminum hydride

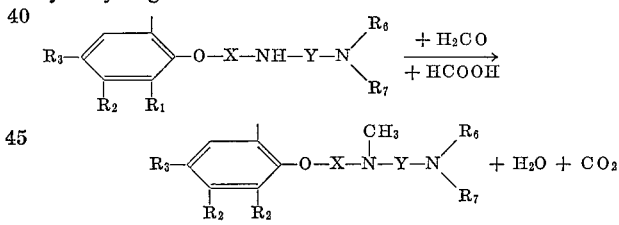

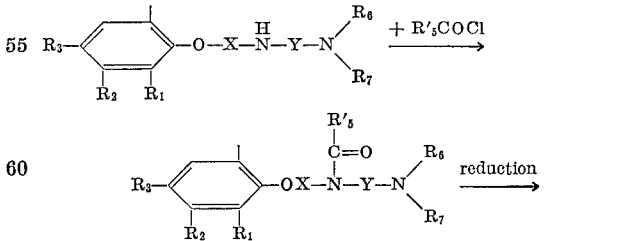

$R'_5$ represents a lower alkyl group with one carbon atom less than $R_5$.

(5) Reaction of a phenoxyacetone, which is either substituted or not, with an aminoethylamine, followed by reduction of the formed azomethine:

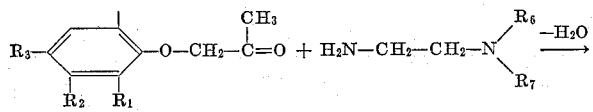

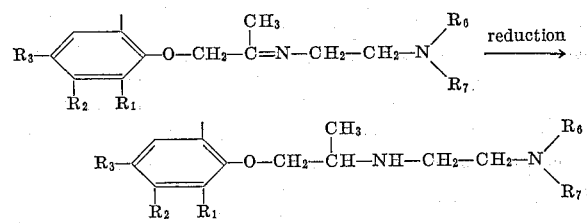

It will be understood that the choice of the method for preparing the desired compound depends on the ease of obtaining the starting materials.

In the following table there are listed some of the compounds prepared by one or the other of the above methods, as hereinafter specifically indicated; the melting points stated are those of the hydrochlorides, all of which are uncorrected and given in degrees centigrade.

The present invention also relates to intermediates in the production of the new phenoxyalkylaminoalkyl-tert. amines.

These intermediates are represented by the following formula:

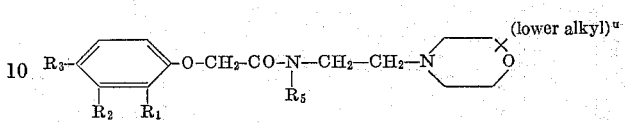

in which $R_1$, $R_2$, $R_3$ and $R_5$ have the above defined meanings, and $n$ is a whole number from 0–2.

These intermediates also possess antitussive activity. They can be prepared as described in method 1 mentioned above.

In the following table, some of the intermediates are listed. The melting points stated, are those of the hydrochlorides, all of which are uncorrected and they are given in degrees centigrade.

TABLE I

| No. | $R_1$ | $R_2$ | $R_3$ | X | $R_5$ | Y | $-N\begin{smallmatrix}R_6\\R_7\end{smallmatrix}$ | Melt. Pt. di-HCl |
|---|---|---|---|---|---|---|---|---|
| 1 | H | H | H | $CH_2-CH_2$ | H | $CH_2-CH_2$ | 4-morph | 203–205 |
| 2 | H | H | H | $CH_2-CH_2$ | $CH_3$ | $CH_2-CH_2$ | 4-morph | 233–234 |
| 3 | $CH_3$ | H | H | $CH_2-CH_2$ | H | $CH_2-CH_2$ | 4-morph | 187–188 |
| 4 | $CH_3$ | H | H | $CH_2-CH_2$ | $CH_3$ | $CH_2-CH_2$ | 4-morph | 256–258 |
| 5 | $CH_3$ | H | Cl | $CH_2-CH_2$ | H | $CH_2-CH_2$ | 4-morph | 210–211 |
| 6 | $CH_3$ | H | Cl | $CH_2-CH_2$ | $CH_3$ | $CH_2-CH_2$ | 4-morph | 248–250 |
| 7 | $OCH_3$ | H | H | $CH_2-CH_2$ | H | $CH_2-CH_2$ | 4-morph | 188–189 |
| 8 | H | H | $OCH_3$ | $CH_2-CH_2$ | H | $CH_2-CH_2$ | 4-morph | 210–212 |
| 9 | H | $OCH_3$ | $OCH_3$ | $CH_2-CH_2$ | H | $CH_2-CH_2$ | 4-morph | 232–233 |
| 10 | H | 3,4-$OCH_2O$ | | $CH_2-CH_2$ | H | $CH_2-CH_2$ | 4-morph | 214–215 |
| 11 | H | $CH_3$ | Cl | $CH_2-CH_2$ | H | $CH_2-CH_2$ | 4-morph | 219–220 |
| 12 | H | H | F | $CH_2-CH_2$ | H | $CH_2-CH_2$ | 4-morph | 187–188 |
| 13 | H | $CF_3$ | H | $CH_2-CH_2$ | H | $CH_2-CH_2$ | 4-morph | 198–200 |
| 14 | Cl | H | H | $CH_2-CH_2$ | H | $CH_2-CH_2$ | 4-morph | 179–181 |
| 15 | Cl | H | Cl | $CH_2-CH_2$ | H | $CH_2-CH_2$ | 4-morph | 191–192 |
| 16 | H | Cl | H | $CH_2-CH_2$ | H | $CH_2-CH_2$ | 4-morph | 217–219 |
| 17 | H | H | $CH_3$ | $CH_2-CH_2$ | H | $CH_2-CH_2$ | 4-morph | 195–197 |
| 18 | H | $CH_3$ | H | $CH_2-CH_2$ | H | $CH_2-CH_2$ | 4-morph | 206–208 |
| 19 | H | H | $NO_2$ | $CH_2-CH_2$ | H | $CH_2-CH_2$ | 4-morph | 212–213 |
| 20 | H | $OCH_3$ | H | $CH_2-CH_2$ | H | $CH_2-CH_2$ | 4-morph | 214–215 |
| 21 | $OC_2H_5$ | H | H | $CH_2-CH_2$ | H | $CH_2-CH_2$ | 4-morph | 165–167 |
| 22 | Br | H | H | $CH_2-CH_2$ | H | $CH_2-CH_2$ | 4-morph | 170–173 |
| 23 | $OC_3H_7$ | H | H | $CH_2-CH_2$ | H | $CH_2-CH_2$ | 4-morph | 154–155 |
| 24 | $OC_4H_9$ | H | H | $CH_2-CH_2$ | H | $CH_2-CH_2$ | 4-morph | 159–160 |
| 25 | H | Br | H | $CH_2-CH_2$ | H | $CH_2-CH_2$ | 4-morph | 220–222 |
| 26 | H | H | Br | $CH_2-CH_2$ | H | $CH_2-CH_2$ | 4-morph | 219–220 |
| 27 | $C_2H_5$ | H | H | $CH_2-CH_2$ | H | $CH_2-CH_2$ | 4-morph | 168–170 |
| 28 | H | F | H | $CH_2-CH_2$ | H | $CH_2-CH_2$ | 4-morph | 192–193 |
| 29 | F | H | H | $CH_2-CH_2$ | H | $CH_2-CH_2$ | 4-morph | 185–187 |
| 30 | H | H | Cl | $CH_2-CH_2$ | H | $CH_2-CH_2$ | 4-morph | 210–212 |
| 31 | H | H | H | $CH_2-CH_2$ | H | $CH_2-CH_2$ | 4-thiomorph | 208–210 |
| 32 | H | H | H | $CH_2-CH_2$ | H | $CH_2-CH_2$ | 1-piperid | 223–224 |
| 33 | H | H | H | $CH_2-CH_2$ | H | $CH_2-CH_2$ | 1-pyrrolid | 199–200 |
| 34 | H | H | H | $CH_2-CH_2$ | H | $CH_2-CH_2$ | Diethylam | 144–146 |
| 35 | H | H | H | $CH_2-CH_2$ | H | $CH_2-CH_2$ | Dimethylam | 199–200 |
| 36 | H | H | H | $CH_2-CH$ \| $CH_3$ | H | $CH_2-CH_2$ | 4-morph | 222–223 |
| 37 | H | H | H | $CH_2-CH_2$ | H | $CH_2-CH$ \| $CH_3$ | 4-morph | B.P. 145 (0.5 mm.) |
| 38 | H | H | H | $CH-CH_2$ \| $CH_3$ | H | $CH_2-CH_2$ | 4-morph | 188–190 |
| 39 | H | H | H | $CH_2-CH_2$ | H | $CH-CH_2$ \| $CH_3$ | 4-morph | 162–163 |
| 40 | H | H | H | $(CH_2)_3$ | H | $CH_2-CH_2$ | 4-morph | 182–184 |
| 41 | H | H | H | $CH_2-CH_2$ | H | $(CH_2)_3$ | 4-morph | 214–216 |
| 42 | H | H | H | $CH_2-CH_2$ | H | $CH_2-CH_2$ | 4-(2,6-dimethyl-morph) | 224–226 |

TABLE II

| No. | R1 | R2 | R3 | R5 | (lower alkyl)n | Melting Pt. monohydrochloride |
|---|---|---|---|---|---|---|
| 1 | H | H | Cl | H | n-0 | 177–178 |
| 2 | H | CH3 | Cl | H | n-0 | 158–159 |
| 3 | H | H | F | H | n-0 | 159–160 |
| 4 | H | CF3 | H | H | n-0 | 179–181 |
| 5 | H | Cl | H | H | n-0 | 130–132 |
| 6 | H | H | CH3 | H | n-0 | 126–127 |
| 7 | H | CH3 | H | H | n-0 | 146.5 |
| 8 | H | H | H | H | n-0 | 124–126 |
| 9 | CH3 | H | H | H | n-0 | 144–146 |
| 10 | CH3 | H | Cl | H | n-0 | 166–167 |
| 11 | OCH3 | H | H | H | n-0 | 141–142 |
| 12 | H | H | OCH3 | H | n-0 | 132–133 |
| 13 | H | OCH3 | OCH3 | H | n-0 | 216–218 |
| 14 | H | —OCH2O— | | H | n-0 | 142–143 |
| 15 | H | H | H | H | 2,6 di-CH3 | 187.5–188.5 |

The following specific examples are illustrative of the methods of preparation of the compounds according to the invention.

Variations will be apparent to those skilled in the art.

Example 1

A solution of 17.05 grams of phenoxyacetyl chloride in 150 ccs. of dry benzene is added slowly to a solution of 13.1 grams of 4-(2-aminoethyl)-morpholine in 150 ccs. of dry benzene while stirring and cooling with water.

After the addition, the mixture is stirred for one hour at room temperature. A white precipitate separates, consisting mainly of the hydrochloride of unreacted base.

The whole of the mixture is shaken with 100 ccs. of water and 4 ccs. of 4 N hydrochloric acid. The benzene layer is washed once with 25 ccs. of water. The combined aqueous solutions are made alkaline and extracted with benzene. The benzene extract is dried and the solvent is removed by evaporation in vacuo, leaving 21.2 grams of 4-[2-(phenoxyacetylamino)ethyl]-morpholine as an oil. The hydrochloric acid salt of this compound melts at 124–125°. In the same way the other intermediate compounds of Table II are prepared.

Example 2

A solution of 13.2 grams of the free base obtained above in a mixture of 125 ccs. of benzene and 50 ccs. of diethyl ether is added dropwise, with stirring, to a solution of 5 grams of lithium aluminum hydride in 75 ccs. of diethyl ether. The rate of addition is such that the reaction-mixture keeps boiling of its own. Refluxing and stirring is continued for 16 hours.

After cooling, 20 ccs. of water are added and the mixture is filtered, using a filter-aid (Hyflo Supercel). The filter cake is washed three times with boiling benzene and the combined benzene solutions are dried over magnesium sulphate. Evaporation of the solvent in vacuo leaves an oil which is dissolved in 125 ccs. of absolute ethanol. Ethanolic hydrogen chloride (2 equivs.) is added and the precipitated crystals are filtered.

Yield: 12.4 grams of 4[2 - (2 - phenoxyethylamino) ethyl]-morpholine dihydrochloride, having a melting point of 203–205° C.

The compounds identified as Nos. 3, 5, 7, 8, 9, 10, 11, 12, 13, 16, 17, 18, 32, 43 and 44 on Table I are prepared in the same way.

Example 3

A mixture of 3.23 grams of 4-[2-(2-phenoxyethylamino)ethyl]-morpholine dihydrochloride, 1.36 grams of sodium formate, 5 ccs. of formic acid (98%) and 4.7 ccs. of an aqueous formaldehyde solution (36%) is heated for about 30 minutes on a steam bath with stirring, until the evolution of carbondioxide has ceased. The cooled solution is made strongly alkaline by addition of a concentrated potassium hydroxide solution and extracted repeatedly with benzene.

The extract is dried, the solvent removed by distillation and the residue dissolved in ethanol. After adding ethanolic hydrogen chloride, white crystals of 4-[2-(N-methyl-2-phenoxyethylamino)-ethyl] - morpholine dihydrochloride, with a melting point of 233–234° C., are obtained. Yield: 2.95 g. (87.5%).

Compounds 4 and 6 from Table I are prepared in the same way.

Example 4

To a stirred solution of 5.2 grams of 4-(2-aminoethyl)-morpholine in 30 ccs. of benzene there are added, dropwise, 4.5 grams of 3-phenoxypropylbromide. The mixture is refluxed for 16 hours with continuous stirring. On cooling, the separate hydrobromide of unchanged starting base is filtered off. The basic products are extracted from the solution with the aid of hydrochloric acid. The acid aqueous extract is made alkaline and extracted repeatedly with benzene. The combined benzene extracts are worked up as described above.

The 4-[2-(3-phenoxypropylamino)ethyl] - morpholine dihydrochloride obtained melts at 192–193° C.

Compounds 14, 15, 19, 20, 21, 22, 23, 24, 25, 26, 27, 28, 29, 30, 31, 32, 33, 34, 35, 36, 37 and 39 of Table I are prepared in the same way.

Example 5

In the same way as described in Example 1, but starting from 2-phenoxypropionyl chloride, the 4-[2-(2-phenoxypropylamino) - ethyl]-morpholine dihydrochloride is obtained, which has a melting point of 188–190° C.

Example 6

To a solution of 10 grams of N-(phenoxyacetyl)-alanine in 135 ccs. of dry benzene are added with stirring 6.25 ccs. of triethylamine, 4.55 ccs. of ethyl chloroformate and, after about 15 minutes, 3.55 ccs. morpholine. Then the reaction-mixture is heated with continuous stirring on a steam bath for about two hours. The solution is allowed to cool, washed with 25 ccs, of 04 N hydrochloric acid and subsequently with 2 N sodium hydroxide. After drying, the benzene is removed by distillation. The residual, crude 4-[2-phenoxyacetylamino)-propionyl]-morpholine is reduced with lithium aluminum hydride in a manner similar to that described in Example 2.

The 4 - [2-(2-phenoxyethylamino)propyl]-morpholine dihydrochloride thus obtained melts at 162–163° C.

Example 7

A mixture of 13.0 grams of 4-(2-aminoethyl)-morpholine, 16.8 grams of phenoxyacetone and 60 ccs. of dry benzene is refluxed, the water formed being collected in a water separator.

After 2½ hours, the benzene is removed by distillation and the residue dissolved in 250 ccs. of methanol.

To this solution there are added 5 grams of Raney nickel and the mixture is hydrogenated catalytically at 90° C. and 80 atm, pressure. After cooling, the catalyst is removed by filtration, ethanolic hydrogen chloride is added to the solution, and the precipitated crystals are filtered.

Yield: 7.7 grams of 4-[2-(1-methyl-2-phenoxyethylamino)-ethyl]-morpholine dihydrochloride having a melting point of 222–223° C.

What is claimed is:

1. 4-[2-(2-phenoxyethylamino)-ethyl]-morpholine.
2. 4-[2-(2-o-methylphenoxyethylamino-ethyl] - morpholine.
3. 4-[2-(2 - o-methoxyphenoxyethylamino) - ethyl]-morpholine.
4. 4-[2-(2 - o - ethoxyphenoxyethylamino) - ethyl]-morpholine.
5. 4 - [2 - 2 - m - fluorophenoxyethylamino) - ethyl]-morpholine.

6. 4 - [2 - (2 - p - fluorophenoxyethylamino)-ethyl]-morpholine.

7. 4 - [2 - 2 - p - chlorophenoxyethylamino) - ethyl]-morpholine.

8. A compound selected from the class of compounds having the formula:

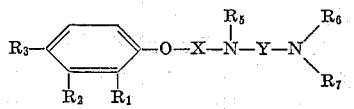

in which
- $R_1$ is selected from the class consisting of hydrogen, lower alkyl, lower alkoxy, trifluoromethyl, fluoro, chloro, bromo and nitro,
- $R_2$ and $R_3$ are selected from the class consisting of hydrogen, lower alkyl, lower alkoxy, trifluoromethyl, fluoro, chloro, bromo and nitro, and methylene dioxy when $R_2$ and $R_3$ are taken together,
- $R_5$ is selected from the class consisting of hydrogen and lower alkyl,
- $R_6$ and $R_7$ together with the nitrogen atom form a member selected from the group consisting of Z-morpholino, Z-thiomorpholino, Z-piperidino and Z-pyrrolidino, wherein Z is selected from the group consisting of hydrogen and lower alkyl; and
- X and Y are selected from the class consisting of straight and branched alkylene chains having from 2 to 4 carbon atoms; and physiologically acceptable acid addition salts of said compounds.

References Cited by the Examiner

UNITED STATES PATENTS

| | | | |
|---|---|---|---|
| 2,428,978 | 10/1947 | Martin et al. | 260—559 |
| 2,895,995 | 7/1959 | Willey | 260—559 |
| 3,037,991 | 6/1962 | Szmuszkovicz | 260—247 X |

FOREIGN PATENTS

| | | |
|---|---|---|
| 1,240,597 | 8/1960 | France. |
| 832,250 | 6/1960 | Great Britain. |

HENRY R. JILES, *Acting Primary Examiner.*

ROBERT L. PRICE, JOSE TOVAR,
*Assistant Examiners*